(12) United States Patent
Thompson et al.

(10) Patent No.: US 9,488,120 B2
(45) Date of Patent: Nov. 8, 2016

(54) APPARATUS AND METHOD FOR IN SITU FUEL INJECTOR CALIBRATION IN AN INTERNAL COMBUSTION ENGINE

(71) Applicant: Westport Power Inc., Vancouver (CA)

(72) Inventors: Jeffrey J. Thompson, Vancouver (CA); Olivier P. M. Lebastard, Delta (CA)

(73) Assignee: WESTPORT POWER INC., Vancouver (CA)

( * ) Notice: Subject to any disclaimer, the term of this patent is extended or adjusted under 35 U.S.C. 154(b) by 413 days.

(21) Appl. No.: 14/229,879

(22) Filed: Mar. 29, 2014

(65) Prior Publication Data

US 2014/0214307 A1 Jul. 31, 2014

Related U.S. Application Data

(63) Continuation of application No. PCT/CA2012/050656, filed on Sep. 20, 2012.

(30) Foreign Application Priority Data

Sep. 30, 2011 (CA) .................................. 2754137

(51) Int. Cl.
*B60T 7/12* (2006.01)
*F02D 41/14* (2006.01)
(Continued)

(52) U.S. Cl.
CPC ......... *F02D 41/1401* (2013.01); *F02D 19/024* (2013.01); *F02D 19/025* (2013.01);
(Continued)

(58) Field of Classification Search
CPC ..... F02D 35/023; F02D 33/00; G01M 15/00
USPC ........ 701/101–103, 115; 123/436; 73/114.45
See application file for complete search history.

(56) References Cited

U.S. PATENT DOCUMENTS

| 4,426,980 A | 1/1984 | Eisele et al. |
| 6,188,951 B1 | 2/2001 | Beechie et al. |

(Continued)

FOREIGN PATENT DOCUMENTS

| CN | 101161999 A | 4/2008 |
| CN | 101858427 A | 10/2010 |

(Continued)

OTHER PUBLICATIONS

IInternational Search Report and Written Opinion of the International Searching Authority issued on Oct. 17, 2012, in connection with International Application No. PCT/CA2012/050656.

(Continued)

*Primary Examiner* — John Kwon
(74) *Attorney, Agent, or Firm* — Carie Mager; C. L. Kyle

(57) ABSTRACT

An apparatus and method are provided for calibrating injection of fuel into at least one combustion chamber of an internal combustion engine. The internal combustion engine comprises at least one fuel injector and a fuel rail. The fuel rail is pressurized to a fuel rail pressure. The method comprises steps of (a) calculating an indicated torque for the internal combustion engine operating at a target fuelling from inputs comprising a fuelling command; (b) calculating a friction torque for the internal combustion engine from inputs comprising the target engine speed; (c) calculating a torque error from a difference between the indicated torque and the friction torque; and (d) determining a pulse-width correction factor for a first baseline pulse-width applied to actuate the at least one fuel injector whereby the torque error is below a predetermined threshold when the internal combustion engine is operating at the target fuelling.

45 Claims, 10 Drawing Sheets

(51) Int. Cl.
*F02D 41/24* (2006.01)
*F02D 19/02* (2006.01)
*F02D 41/30* (2006.01)
*F02D 41/20* (2006.01)

(52) U.S. Cl.
CPC ........... *F02D41/2467* (2013.01); *F02D 41/30* (2013.01); *F02D 2041/2027* (2013.01); *F02D 2041/2055* (2013.01); *F02D 2200/1004* (2013.01); *Y02T 10/32* (2013.01)

(56) References Cited

U.S. PATENT DOCUMENTS

| | | |
|---|---|---|
| 6,907,861 B2 | 6/2005 | Asano et al. |
| 6,985,807 B2 | 1/2006 | Asano et al. |
| 6,988,030 B2 | 1/2006 | Asano et al. |
| 6,990,950 B2 | 1/2006 | Asano et al. |
| 6,990,958 B2 | 1/2006 | Asano et al. |
| 7,021,288 B2 | 4/2006 | Asano et al. |
| 7,032,582 B2 | 4/2006 | Asano et al. |
| 7,069,138 B2 | 6/2006 | Boehnig et al. |
| 7,179,197 B2 | 2/2007 | Asano et al. |
| 7,363,912 B2 | 4/2008 | Asano et al. |
| 7,503,875 B2 | 3/2009 | Fujii et al. |
| 7,596,992 B2 | 10/2009 | Asano et al. |
| 7,660,661 B2 | 2/2010 | Asano et al. |
| 7,664,592 B2 | 2/2010 | Asano et al. |
| 2002/0055815 A1 | 5/2002 | Ju |
| 2004/0089273 A1 | 5/2004 | Tonetti et al. |
| 2004/0267433 A1 | 12/2004 | Asano et al. |
| 2005/0065709 A1* | 3/2005 | Cullen ................ F02D 41/0087 701/112 |
| 2005/0090968 A1 | 4/2005 | Sato |
| 2005/0205063 A1* | 9/2005 | Kolmanovsky ........... F01L 9/04 123/436 |
| 2009/0292440 A1* | 11/2009 | Ichihara .............. F02D 41/0085 701/102 |
| 2010/0100302 A1 | 4/2010 | Ullrich et al. |
| 2010/0262344 A1 | 10/2010 | Fujii et al. |
| 2012/0130610 A1 | 5/2012 | Lee et al. |

FOREIGN PATENT DOCUMENTS

| | | |
|---|---|---|
| DE | 102006027405 B3 | 12/2007 |
| EP | 0926404 A2 | 6/1999 |
| EP | 1491751 A1 | 12/2004 |
| GB | 2397851 A | 8/2004 |
| JP | 2002295291 A | 10/2002 |

OTHER PUBLICATIONS

International Preliminary Report on Patentability and Written Opinion of the International Bureau issued on Apr. 1, 2014 in connection with PCT/CA2012/050656.

Search Report issued by the EPO on Feb. 5, 2016 in connection with co-pending European Application No. 12835781.1.

Search Report issued by the SIPO on Oct. 28, 2015 in connection with co-pending Chinese Application No. 201280048032.8.

* cited by examiner

APPARATUS AND METHOD FOR IN SITU FUEL INJECTOR CALIBRATION IN AN INTERNAL COMBUSTION ENGINE

CROSS-REFERENCE TO RELATED APPLICATIONS

This application is a continuation of International Application No. PCT/CA2012/050656 having an international filing date of Sep. 20, 2012 entitled "Apparatus And Method For In Situ Fuel Injector Calibration In An Internal Combustion Engine". The '656 international application claimed priority benefits, in turn, from Canadian Patent Application No. 2,754,137 filed on Sep. 30, 2011. The '656 international application is hereby incorporated by reference herein in its entirety.

FIELD OF THE INVENTION

The present invention relates to fuel injectors and, in particular, to an apparatus and method calibrate fuel injectors installed in an engine operating at zero brake torque. The method can be employed to trim pulse-widths of signals used to actuate the fuel injectors in order to provide precise levels of torque to an automated manual transmission during shift events.

BACKGROUND OF THE INVENTION

An automated manual transmission, also known as an automatic mechanical transmission or semi-automatic transmission, is a system that employs electronic sensors, pneumatics, actuators and processors to execute gear shifts either under command of an operator or by a computer. Essentially it can be described as a robot operating a manual transmission. To properly shift gears the engine must provide precise and repeatable amounts of torque.

Any transmission that requires the operator to manually synchronize engine crank-shaft revolutions (RPM) with drive-shaft revolutions is non-synchronous. Although automobiles and light duty trucks are almost universally using synchronized transmissions, heavy duty trucks and machinery are still using non-synchronous manual transmissions for a number of reasons. The friction material, such as brass, in synchronizers is more prone to wear and breakage than gears, which are forged steel. The simplicity of the mechanism improves reliability and reduces cost. In addition, the process of shifting a synchronized transmission is slower than that of shifting a non-synchronous transmission which over time has an economical impact as mileage can be reduced. However, there is a great deal of driver skill involved in changing gears. Non-synchronous transmissions are engineered with the understanding that a trained operator will be shifting gears in a known coordination of timing.

Heavy duty truck operators use a technique known as double clutching to change gears. The technique comprises the following steps to upshift. The operator releases the accelerator, depresses the clutch pedal so that the clutch opens, shifts the gearbox into neutral and then releases the clutch pedal so that the clutch closes. The operator waits for the engine speed to decrease to a level suitable for shifting into the next gear, at which point the operator opens the clutch again, shifts into and engages the next gear, closes the clutch, and finally applies the accelerator. An experienced operator can execute the whole maneuver efficiently, and the result is a very smooth gear change.

Conversely, in order to downshift, engine speed must be increased while the gearbox is in neutral before the next gear is engaged. The sequence of steps is as follows. The operator releases the accelerator, depresses the clutch pedal to open the clutch, pulls to neutral, releases the clutch pedal so that the clutch closes and applies the accelerator until the engine speed increases to synchronous speed before initiating gear engagement. When engine speed is synchronous with transmission speed, the driver opens the clutch, engages the gear, closes the clutch and applies the accelerator. This operation can be very difficult to master, as it requires the driver to gauge the speed of the vehicle (transmission) and engine accurately.

Keeping the clutch open while in neutral, as is performed during a typical shift in a synchronous transmission, gives more economy of driver motion and effort compared to double clutching. However, significant wear can take place on the separated clutch plates any time the engine and transmission have varying drive loads. In simple terms, wear occurs the more the clutch has to "slip" to match revolutions between the engine and transmission. Double clutching can minimize this clutch plate wear by encouraging matching of engine and transmission RPMs before the clutch is closed.

Disconnecting drive components during a gear shift by using a clutch properly unloads the engine and transmission of undue pressure applied by opposing components. Double clutching, although time consuming, eases gear selection when an extended delay or variance exists between engine and transmission speeds. Double clutching is typically a testing requirement when obtaining a commercial driver's license.

Experienced drivers use a technique known as clutchless shifting instead of double clutching when shifting gears. Heavy duty trucks carrying heavy loads, for example above 40 tons, can have up to 24 gears. Bringing a truck from standstill to full speed utilizing the double clutch technique requires a lot of effort and concentration from the driver. Many experienced drivers have learned when it is possible to shift gears without using the clutch. This technique is known as clutchless-shift, float-shift, or skip-shift, which eliminates the use of the clutch except when launching or coming to rest. However, uncoordinated execution of the clutchless-shift technique results in gears not synchronizing properly as they are engaged leading to an accelerated wear of the transmission. Both double clutching and clutchless-shift gear selection in non-synchronous manual transmissions requires a skilled driver in order to minimize wear on components and provide an optimal fuel economy.

There is an advantage in providing an automated manual transmission in a heavy duty truck or machinery as it relaxes the requirement for a skilled operator. More junior drivers can be employed to operate the equipment without increase wear on components and a reduction in fuel economy. However, there are a number of challenges in combining an automated manual transmission with an engine fuelled from a gaseous fuel, such as liquefied natural gas (LNG) or compressed natural gas (CNG).

In some engines fuelled with a gaseous fuel such as natural gas, the fuel is in a gaseous phase in a common fuel rail under pressure prior to entering the fuel injectors. A high pressure pump or compressor is used to increase the pressure of the gaseous fuel to a suitable injection pressure in the common fuel rail. In contrast to incompressible fuels such as diesel or gasoline, where it is relatively easy to achieve and maintain a high pressure, the high pressure pump or compressor in a gaseous fuel system is actively working to a greater degree to maintain the gaseous fuel pressure as gaseous fuel is injected into combustion chambers. The gaseous fuel injection pressure must be sufficient to both overcome an in-cylinder pressure experienced when the fuel injectors actuate and to inject the desired amount of fuel in the available time.

The no-load torque reporting accuracy of an engine, that is when the engine is not loaded by the transmission, must be well defined so that gears can be synchronized in the automated manual transmission during gear shifting events. No-load torque control is required whether the double clutch or the clutchless shift technique of gear shifting is employed. The engine must respond in a predictable manner when the gears engage and mesh and the load is transferred to the engine to provide a smooth transition instead of an abrupt and choppy shift event. The automated manual transmission expects that engine speed will remain constant if it commands zero net torque (indicated torque equal to the friction torque). The automated manual transmission is also counting on certain engine speed responses to small torque requests above existing friction torque to provide "sync torque" and "torque bumps", both of which are used during automated shifting. Torque accuracy ultimately depends on fuel delivery accuracy.

The performance of fuel injectors can be characterized by relating a quantity of fuel delivered to their on-time (time open), for example see the plot in FIG. 1 illustrating a Fuel-On-time characteristic. The x-axis shows the commanded amount of fuel, and the y-axis shows the on-time required to deliver that amount of fuel. Each fuel injector has its own Fuel-On-time characteristic. When fuel injectors are manufactured, they are made to comply within a level of Fuel-On-time tolerance, but because of variability introduced by manufacturing tolerances, fuel injectors that are made within specifications are not identical. Additionally, there is significant fuel injection flow change through the fuel injector break-in period. For example, after the first 30 to 50 hours of injection in an engine there can be significant changes in fuel flow through the injectors. Fuel delivery through the injectors continues to change over the operating life of the engine, although more slowly than during the initial break-in period. There can be many reasons for such changes including gas-hole carboning which is caused by the formation of carbon deposits. In dual fuel injectors which inject both a pilot fuel and a primary fuel, such as diesel and natural gas respectively, it has been found that injections for both fuels exhibit the above mentioned behavior.

With reference to FIG. 1, it has been found that the portion of the plot above a critical on-time $T_C$ is within an acceptable level of tolerance for the torque reporting accuracy requirements of the automated manual transmission from fuel injector to fuel injector across production runs and throughout the operational life cycle. In contrast, the portion of the plot below the critical on-time $T_C$ has been found not to be within an acceptable level of tolerance from fuel injector to fuel injector within production runs and throughout the operational life cycle. Accordingly an observed problem is a variation from fuel injector to fuel injector in the amount of fuel injected into a combustion chamber for a commanded short on-time (small fuellings) under consistent differential pressure between fuel rail pressure and in-cylinder pressure. Referring to FIG. 2, a scatter diagram illustrating torque reporting accuracy for uncalibrated fuel injectors is shown. The x-axis shows the commanded net engine torque and the y-axis shows the measured mean brake torque based on a commanded quantity of fuel. An upper torque threshold line 10 and a lower torque threshold line 15 show the range of allowable measured torques for each commanded torque for the automated manual transmission. At lower torques the allowed difference between the upper and lower threshold is less than at higher torques. Data is shown plotted for four different sets of injectors. At torques below approximately 1250 Nm, the measured torque for some of the data rises above the upper threshold or drops below the lower threshold, whereas at torques greater than 1250 Nm the measured torques are within the upper and lower thresholds.

The variation in the quantity of fuel injected for short on-times at no load results in a varying torque response of the engine and therefore varying engine speed responses. This behavior is not suitable for operation with an automated manual transmission as it results in poor shift quality (jerky/rough) and accelerated gear and/or clutch plate wear. Existing practices of injector calibration focus on characterizing a sample set of the fuel injectors on a test engine. The results of this characterization are stored in an engine controller, and the characterization is not adjusted over the lifetime of the fuel injector. Another calibration practice comprises coding each fuel injector and adjusting an average fuel injector characterization when the injector is installed on the engine. As the fuel injectors settle in the engine and age, any open loop characterization preset in the engine controller loses accuracy. There is a need to periodically calibrate fuel injectors in situ for the low fuelling portion of the plot in FIG. 1 in order to provide accurate fuel delivery and therefore torque and engine speed response required by the automated manual transmission.

With reference to FIG. 3, an automated manual transmission 20 can comprise a transmission control unit 30 that sends torque requests to an engine control unit 40 during shifting events. Engine control unit 40 responds to the torque requests and commands engine 50 to deliver the requested torque in order to provide efficient and smooth shifting of gears with minimal wear. A simplified example of a sequence for a clutchless-shift mode of operation is described next.

Transmission control unit 30 determines an upshift is required and sends a first torque request to engine control unit 40. While clutch 60 is still closed engine control unit 40 commands engine 50 to deliver the first requested torque. Typically, when the first requested torque is delivered to automated manual transmission 20 there is neither a propelling force on the driveline nor a retarding force due to engine braking, such that net torque is zero. The current gear is then released.

Transmission control unit 30 sends a second torque request to engine control unit 40 to deliver a second torque that slows down engine 50 in order to synchronize the speed. In other examples the transmission control unit 30 can request a number of intermittent torques between the first and second torque requests in order to encourage a smooth transition of engine speed, thereby providing quick and efficient upshifting. Automated manual transmission 20 engages the next gear when the second torque is delivered and the engine speed has synchronized.

In this one example involving an upshift at a particular operating condition the engine may be required to deliver many distinct torques under no load. Taking into consideration downshifting, double clutch operation and the multitude of gears, and types of shift events in heavy duty trucks and machinery it can be understood that there are many distinct, small torques required and precise engine speed responses to these torques for successful automated manual transmission operation.

U.S. Pat. No. 6,907,861, issued Jun. 21, 2005 to Asano et al. discloses an injection quantity control device for a diesel engine. A fuel injection control device of a diesel engine performs a learning injection during a no-injection period, in which a command injection quantity is zero. A difference between a variation in the engine rotation speed in the case where the learning injection is performed and a variation in the engine rotation speed in the case where the learning injection is not performed is calculated as a rotation speed increase. A torque proportional quantity is calculated by multiplying the rotation speed increase by the engine rotation speed at the time when the learning injection is performed. An injection correction value is calculated from a deviation between the actual injection quantity, which is estimated from the torque proportional quantity, and the command injection quantity. The command injection quantity is corrected based on the injection correction value. Asano et al. teach that the calibration comprises associating predetermined pulse-widths of the fuel injectors with an actual quantity of fuel injected, and correcting the predetermined pulse-widths to deliver the commanded injection quantity.

There is required a new and improved apparatus and method for calibrating the low fuelling behavior of fuel injectors installed in an engine and re-calibrating fuel on-times throughout the life cycle of the fuel injectors and the engine.

SUMMARY OF THE INVENTION

An improved method calibrates injection of fuel into at least one combustion chamber of an internal combustion engine. The internal combustion engine comprises at least one fuel injector and a fuel rail that is pressurized to a fuel rail pressure. The method comprises steps of (a) calculating an indicated torque for the internal combustion engine operating at a target fuelling from inputs comprising a fuelling command, the target fuelling is attained by operating the internal combustion engine at a target engine speed, (b) calculating a friction torque for the internal combustion engine from inputs comprising the target engine speed, (c) calculating a torque error from a difference between the indicated torque and the friction torque, and (d) determining a pulse-width correction factor for a first baseline pulse-width applied to actuate the at least one fuel injector whereby the torque error is within a predetermined range when the internal combustion engine is operating at the target fuelling.

The fuel can be a gaseous fuel such as natural gas, methane or hydrogen. The pulse-width correction factor can be modified in a feedback control loop such that convergence to an acceptable value is generally attained. The method can be performed prior to or after a break-in period of the fuel injector, and can be performed at predetermined time intervals when the internal combustion engine is serviced. The method can further be performed after determining the torque error is outside the predetermined range while the internal combustion engine is idling. The method can be performed on one fuel injector of the internal combustion engine, or on all fuel injectors of the internal combustion engine simultaneously with each fuel injector operating with its own timing. The method is terminated when a temperature of the internal combustion engine is outside a normal engine operating temperature range, or when a vehicle comprising the internal combustion engine has a vehicle speed greater than zero, or when a selected gear of the vehicle is not park or neutral.

The target fuelling can be further manipulated by operating an engine fan in addition to operating at the target engine speed when greater fuelling is required. The method can further comprise successively repeating steps (a) through (d) for a plurality of target fuellings of the internal combustion engine. The method can still further comprise successively repeating steps (a) through (d) for a plurality of fuel pressures in the fuel rail. The method can yet still further comprise a step of successively repeating steps (a) through (d) for a plurality of target fuelling and fuel rail pressure combinations, each respective target fuelling and fuel rail pressure combination defining a calibration condition.

In a preferred method, respective pulse-width correction factors for respective calibration conditions are associated with respective fuelling command and fuel rail pressure combinations. Further, in a preferred method respective pulse-width correction factors for respective uncalibrated fuelling command and fuel rail pressure combinations are determined by interpolating between respective pulse-width correction factors for respective calibrated fuelling command and fuel rail pressure combinations, and further with fixed pulse-width correction factors.

The method can further comprises sub-steps prior to the steps of calculating of (a) commanding the target engine speed for the internal combustion engine, (b) generating the fuelling command to drive the internal combustion engine to the target engine speed, (c) generating the first baseline pulse-width based on the fuelling command and the fuel rail pressure, and (d) generating a first pulse-width as a function of the first baseline pulse-width and the pulse-width correction factor for a first series of injection events for the at least one fuel injector.

The step of determining the pulse-width correction factor can comprise sub-steps of determining the at least one fuel injector is under-fuelling and modifying the pulse-width correction factor to increase the first pulse-width. The step of determining the pulse-width correction factor can still further comprise sub-steps of determining the at least one fuel injector is over-fuelling, and modifying the pulse-width correction factor to decrease the first pulse-width. The step of determining the pulse-width correction factor can yet still further comprise sub-steps of determining the torque error is not within the predetermined range, adjusting the pulse-width correction factor based on the torque error, generating a second fuelling command to drive the internal combustion engine to the first target engine speed, and generating a second pulse-width based on the second fuelling command and the fuel rail pressure for a second series of injection events for the at least one fuel injector. The second pulse-width is preferably generated as a function of a second baseline pulse-width corrected by the pulse-width correction factor, and the first pulse-width is substantially equal to the second pulse-width. Further, if the torque error is within the predetermined range, the pulse-width correction factor is preferably associated with the second fuel command and the fuel rail pressure. A first quantity of fuel that is injected into the combustion chamber when the fuel injector is preferably actuated by the first pulse-width is substantially equal to a second quantity of fuel that is injected into the combustion chamber when the fuel injector is actuated by the second pulse-width when the first quantity of fuel and the second quantity of fuel equal the target fuelling.

An improved apparatus calibrates injection of fuel into at least one combustion chamber of an internal combustion engine. The internal combustion engine comprises at least one fuel injector and a fuel rail pressurized to a fuel rail pressure. The apparatus comprises an engine speed sensor and a computer programmed to (a) calculate an indicated torque for the internal combustion engine operating at a target fuelling from inputs comprising a fuelling command, the target fuelling is attained by operating the internal combustion engine at a target engine speed, (b) calculate a friction torque for the internal combustion engine from inputs comprising the target engine speed, (c) calculate a torque error from a difference between the indicated torque and the friction torque, and (d) determine a pulse-width correction factor for a first baseline pulse-width applied to actuate the at least one fuel injector whereby the torque error is within a predetermined range when the internal combustion engine is operating at the target fuelling.

The fuel can be a gaseous fuel such as natural gas, methane or hydrogen. The pulse-width correction factor can be modified in a feedback control loop. The apparatus can further comprise an operator controlled input to initiate calibration. The computer can be further programmed to terminate calibration when a temperature of the internal combustion engine is outside a normal engine operating temperature range, or when a vehicle comprising the internal combustion engine has a vehicle speed greater than zero, or a selected gear of the vehicle is not park or neutral. The computer can be still further programmed to perform calibration on one fuel injector of the internal combustion engine, or on all fuel injectors of the internal combustion engine simultaneously with each fuel injector operating with its own timing.

The computer can also be programmed to operate an engine fan in addition to operating the engine at the target engine speed in order to attain greater fuelling levels. The computer can be further programmed to successively repeat steps (a) through (d) for a range of target engine speeds of the internal combustion engine. The computer can be still further programmed to successively repeat steps (a) through (d) for a range of fuel pressures in the fuel rail. The computer can be yet still further programmed to successively repeat steps (a) through (d) for a plurality of target engine speed and fuel rail pressure combinations, each respective target fuelling and fuel rail pressure combination defining a calibration condition. Respective pulse-width correction factors for respective calibration conditions are preferably associated with respective fuelling command and fuel rail pressure combinations. Respective pulse-width correction factors for respective uncalibrated fuelling command and fuel rail pressure combinations are preferably determined by interpolating between respective pulse-width correction factors for respective calibrated fuelling command and fuel rail pressure combinations, and further with fixed pulse-width correction factors.

The computer can be further programmed to (a) command the target engine speed for the internal combustion engine, (b) generate the fuelling command to drive the internal combustion engine to the target engine speed, (c) generate the first baseline pulse-width based on the fuelling command and the fuel rail pressure, and (d) generate a first pulse-width as a function of the first baseline pulse-width and the pulse-width correction factor for a first series of injection events for the at least one fuel injector. The pulse-width correction factor can be modified to increase the first pulse-width when the at least one fuel injector is under-fuelling. The pulse-width correction factor can also be modified to decrease the first baseline pulse-width when the at least one fuel injector is over-fuelling.

The computer can be further programmed to determine when the torque error is not within the predetermined range, to adjust the pulse-width correction factor based on the torque error, to generate a second fuelling command to drive the internal combustion engine to the target engine speed, and to generate a second pulse-width based on the second fuelling command and the fuel rail pressure for a second series of injection events for the at least one fuel injector. The second pulse-width is preferably generated as a function of a second baseline pulse-width and the pulse-width correction factor, and the first pulse-width is substantially equal to the second pulse-width.

DETAILED DESCRIPTION OF PREFERRED EMBODIMENT(S)

Figure 3:
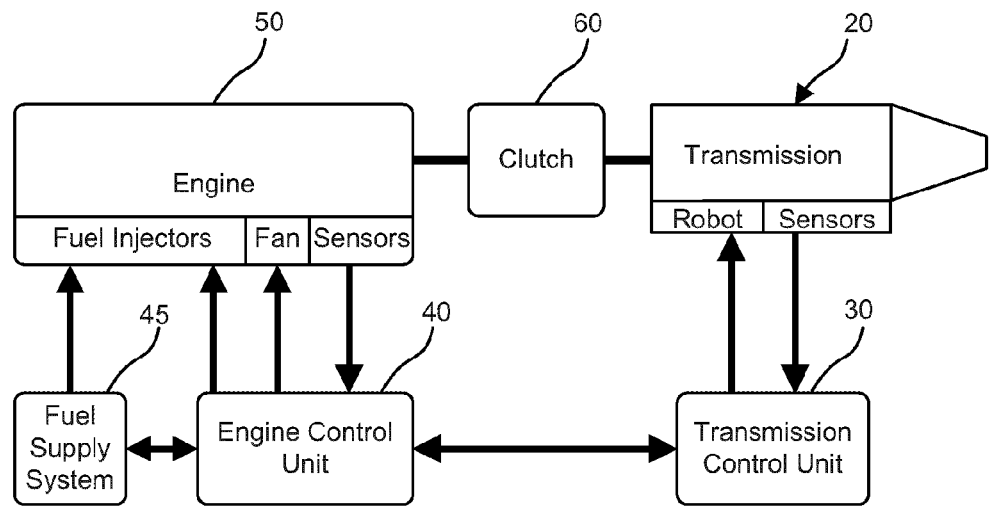
FIG. 3 is a simplified schematic view of an internal combustion engine and an automated manual transmission.
Figure 4:
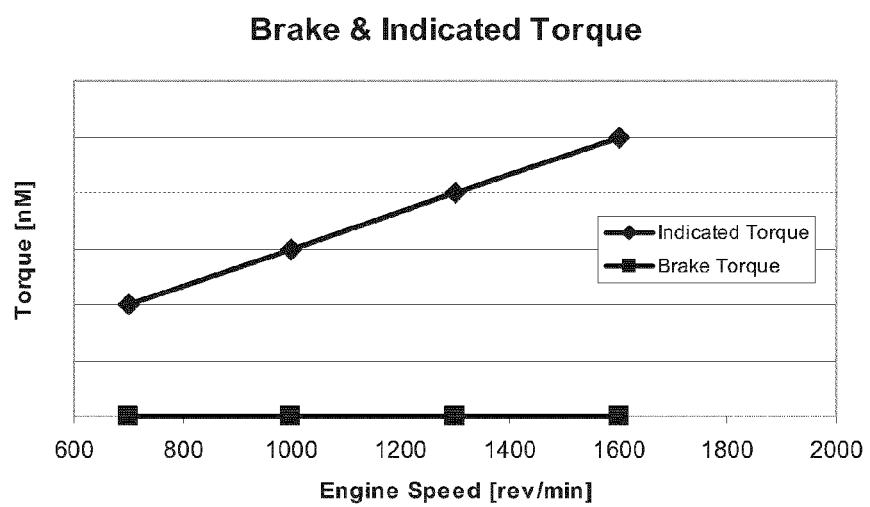
FIG. 4 is a plot of a generalized relationship between engine speed with respect to brake torque and indicated torque under a no-load operating condition.
Figure 5:
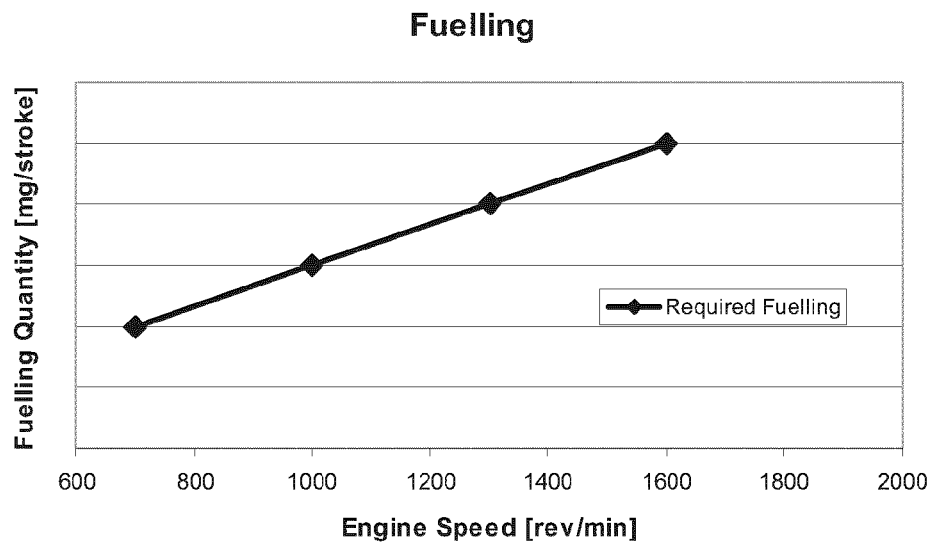
FIG. 5 is a plot of a generalized relationship between engine speed and an amount of fuel delivered according to the indicated torque of FIG. 4.

With reference to the figures and first to FIGS. 3 and 4, it has been determined that friction of engine 50 can be known accurately for a given engine design and configuration. Friction of engine 50 includes mechanical friction between moving parts and pumping losses associated with expelling exhaust gas from engine 50 and other air handling functions. FIG. 4 illustrates the general relationship between engine speed and indicated torque during zero brake torque operation of engine 50. Indicated torque is defined as the torque generated in cylinders of engine 50 during combustion, and acting on the crankshaft of engine 50 without friction. Zero brake torque is a no-load operating mode wherein engine 50 operates without being loaded from automated manual transmission 20. The relationship in FIG. 4 illustrates that as the engine speed increases so too does the indicated torque required to overcome the friction at respective engine speeds. With additional reference to FIG. 5, in order to generate higher levels of indicated torque and greater engine speed more fuel must be burned in engine 50. The amount of fuel burned in engine 50 at a given timing and fuel rail pressure reflects the friction in engine 50.

Figure 1:
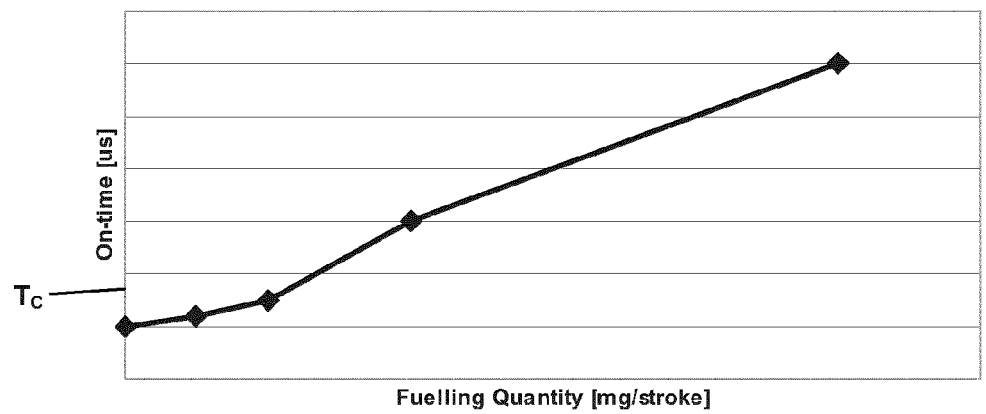
FIG. 1 is a plot of a generalized relationship between an amount of fuel commanded and fuel injector on-time before calibration.
Figure 2:
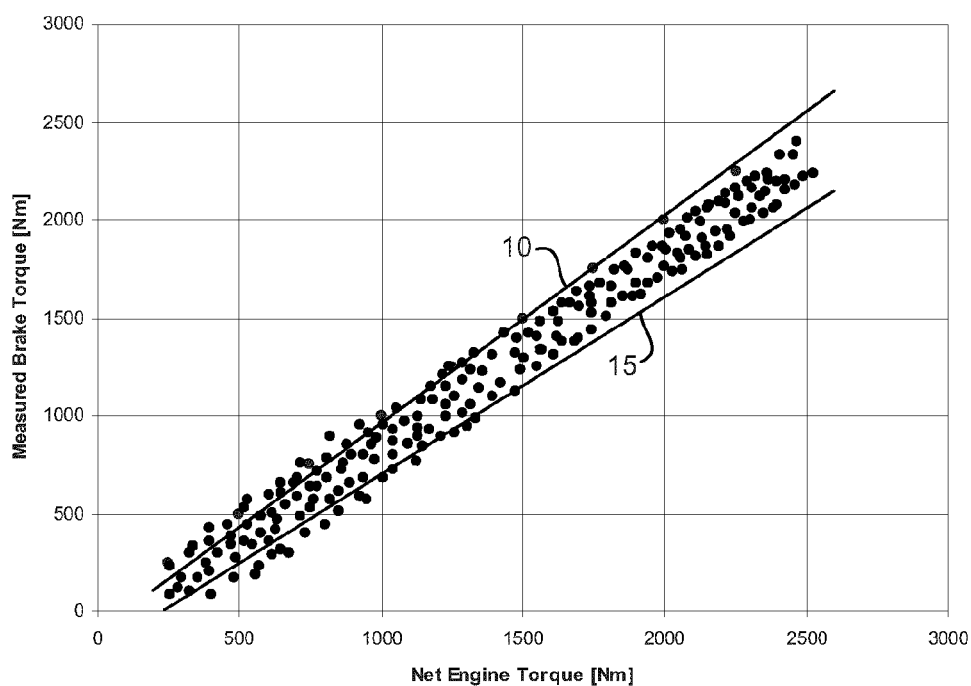
FIG. 2 is a plot illustrating torque reporting accuracy for uncalibrated fuel injectors with respect to upper and lower threshold limit lines.
Figure 6:
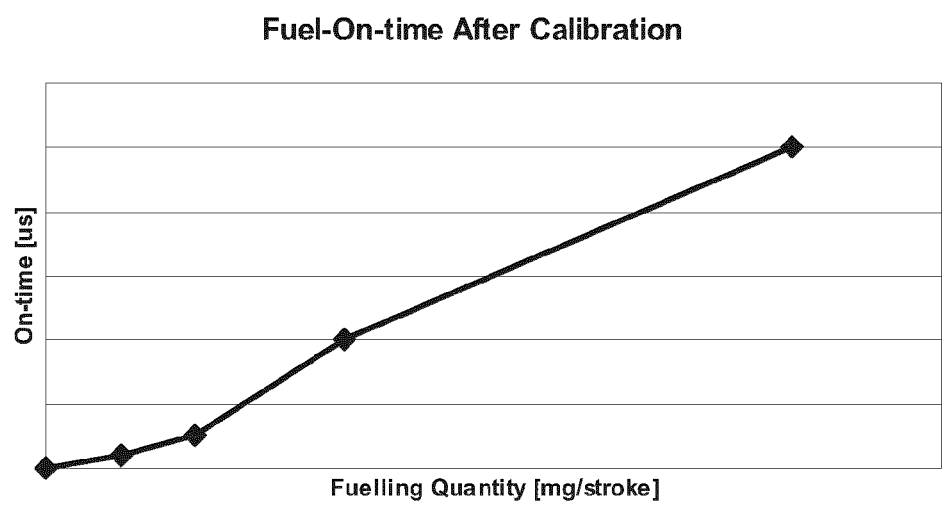
FIG. 6 is a plot of a generalized relationship between an amount of fuel commanded and fuel injector on-time after calibration.

Referring to FIGS. 1 and 6, the low fuelling portion of the Fuel-On-time curve can be calibrated to reflect real fuel injector on-time needed to overcome the mechanical friction and the pumping losses of engine 50 at a given engine speed with a preset timing and fuel rail pressure. The calibration is reflected as a shift in the Fuel-On-time characteristic. In the case of FIG. 6, the low fuelling portion of the curve shifted downwards to reflect the real fuel injector on-time required to inject a predetermined amount of fuel into the combustion chamber of engine 50. However, other fuel injectors may require a shift of the curve upwards, or that different portions of the curve adjust by different amounts or in different directions. In the present example the fuel is a gaseous fuel such as natural gas, methane or hydrogen. In other embodiments the fuel can be other types of gaseous fuel, or a liquid fuel such as diesel, gasoline and ethanol-gasoline blends.

Figure 7:
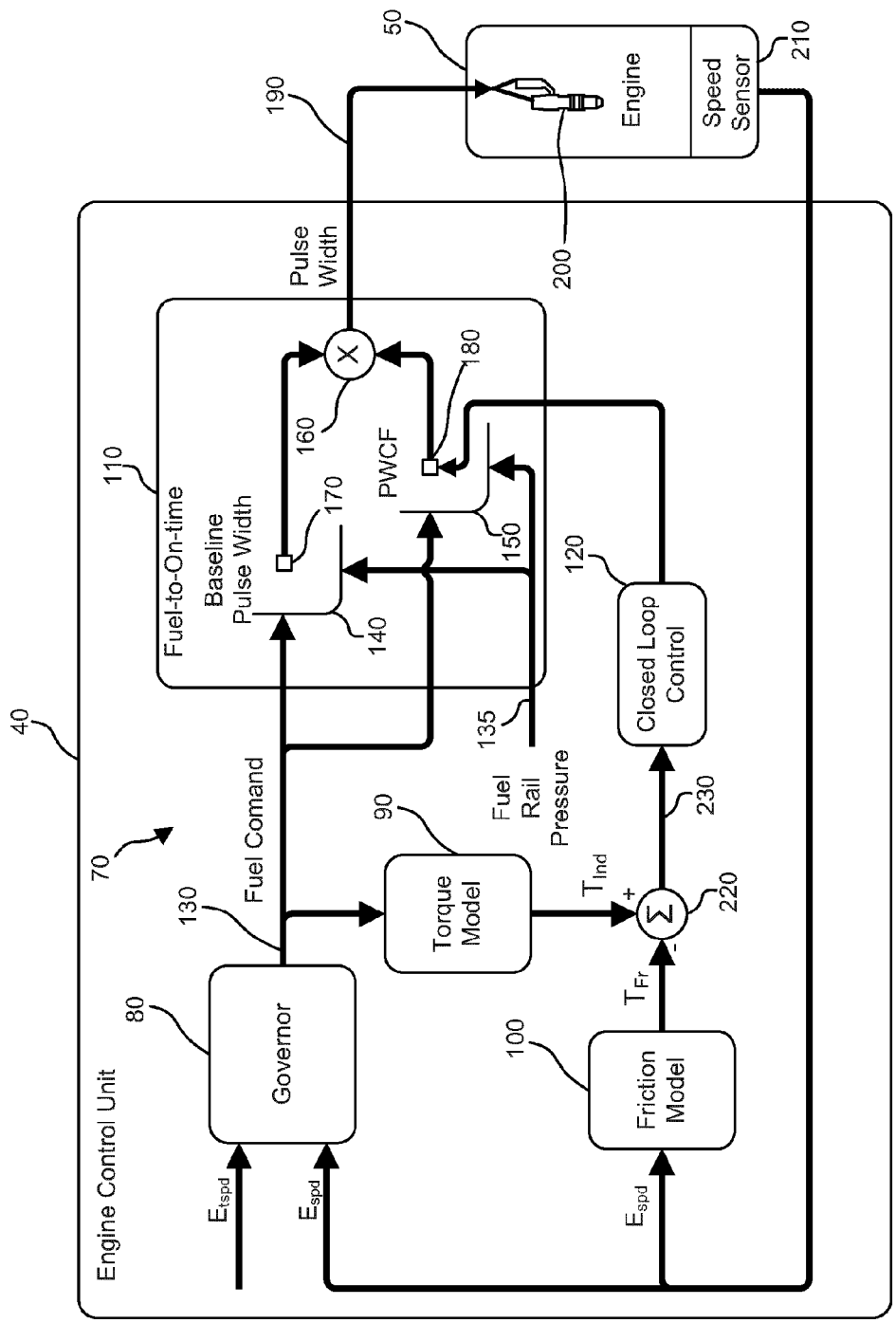
FIG. 7 is a schematic view of one embodiment of the apparatus for in situ fuel injector calibration in an internal combustion engine.

Referring now to the illustrated embodiment of FIG. 7, there is shown an apparatus for in situ fuel injector calibration indicated generally by reference numeral 70. Apparatus 70 comprises software components stored in and executing on engine control unit 40, seen in FIG. 3, including governor 80, torque model 90, friction model 100, fuel-to-on-time unit 110 and closed loop control 120. Engine control unit 40 is a computer comprising a processor and memories.

Governor 80 is responsive to inputs comprising target engine speed $E_{ts}$pd and actual engine speed $E_{sp}$d and generates fuel command 130. The governor generates whatever fuel command is required to drive engine 50 to target engine speed $E_{ts}$pd. Fuel command 130 is representative of a requested quantity of fuel, for example in units of mg/stroke, that should be injected into the combustion chamber of engine 50 during each injection event. Governor 80 is a conventional governor used in vehicles, for example to maintain an idling engine speed when a vehicle is in neutral.

Fuel-to-On-time unit 110 comprises baseline pulse-width map 140, pulse-width correction factor map 150 and multiplier 160. Fuel-to-On-time unit 110 is responsive to fuel command 130 and fuel rail pressure 135 and generates baseline pulse-width 170 and pulse-width correction factor 180 from respective maps 140 and 150. All pulse-width correction factors 180 in map 150 have an initial value of one before the first in situ calibration. Multiplier 160 is responsive to baseline pulse-width 170 and pulse-width correction factor 180 to generate pulse-width 190.

Fuel injector 200 in engine 50 is responsive to pulse-width 190 to inject a quantity of fuel into the combustion chamber. Speed sensor 210 measures actual engine speed $E_{sp}$d resulting from combustion of the quantity of fuel. When pulse-width 190 is constant during multiple successive injections engine 50 reaches a steady state speed. The application of pulse-width 190 to fuel injector 200 is controlled in a coordinated timing by engine control unit 40 of FIG. 3.

Figure 8:
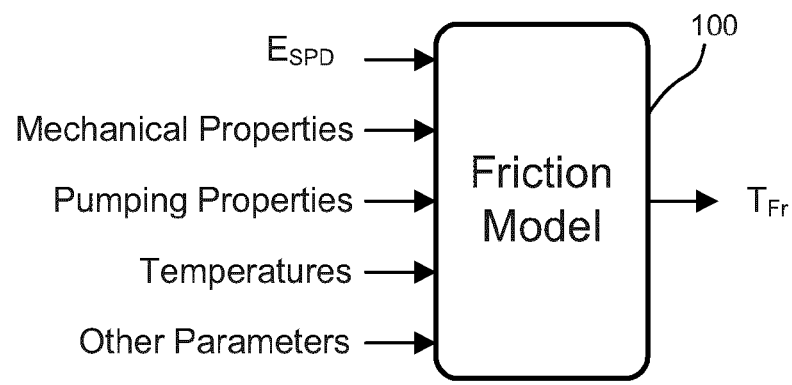
FIG. 8 is a schematic view of a friction model.
Figure 9:
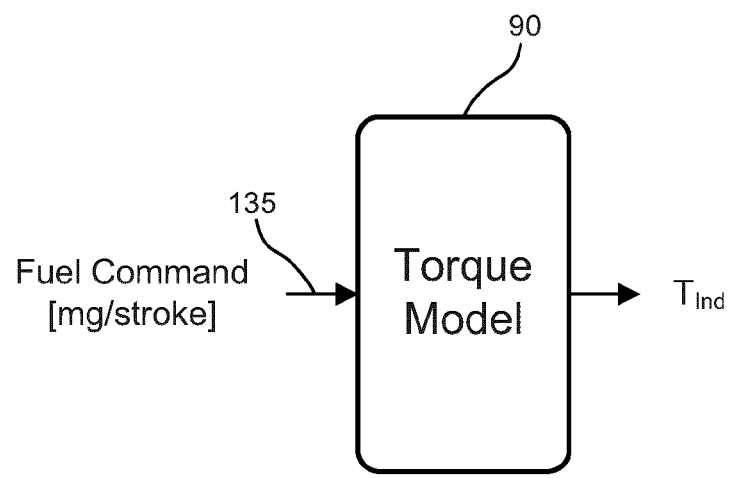
FIG. 9 is a schematic view of a torque model.

Referring to FIG. 8, friction model 100 is responsive to actual engine speed $E_{spd}$, in addition to mechanical properties, pumping properties and operating temperatures, such as oil temperature, associated with engine 50. Friction model 100 calculates friction torque $T_{Fr}$ representative of the torque required to overcome engine friction at actual engine speed $E_{spd}$. Referring to FIG. 9, torque model 90 is responsive to fuel command 130 and calculates estimated indicated torque TM representative of the theoretical maximum torque produced by combustion of fuel in the combustion chambers of engine 50. Friction torque $T_{Fr}$ is also known as nominal friction percentage torque (NFPT), and estimated indicated torque TM is also known as actual engine percentage torque (AEPT).

Referring again to FIG. 7, summer 220 subtracts friction torque $T_{Fr}$ from estimated indicated torque $T_{Ind}$ and generates torque error 230. Closed loop control 120 is responsive to torque error 230 to update pulse-width correction factor 180 during calibration such that torque error 230 is reduced preferably to zero, but practically to within a predetermined range that is within a tolerance acceptable to automated manual transmission 20 in FIG. 3. Closed loop control 120 can employ a PID control mechanism, but other types of closed loop control are possible.

Figure 10:
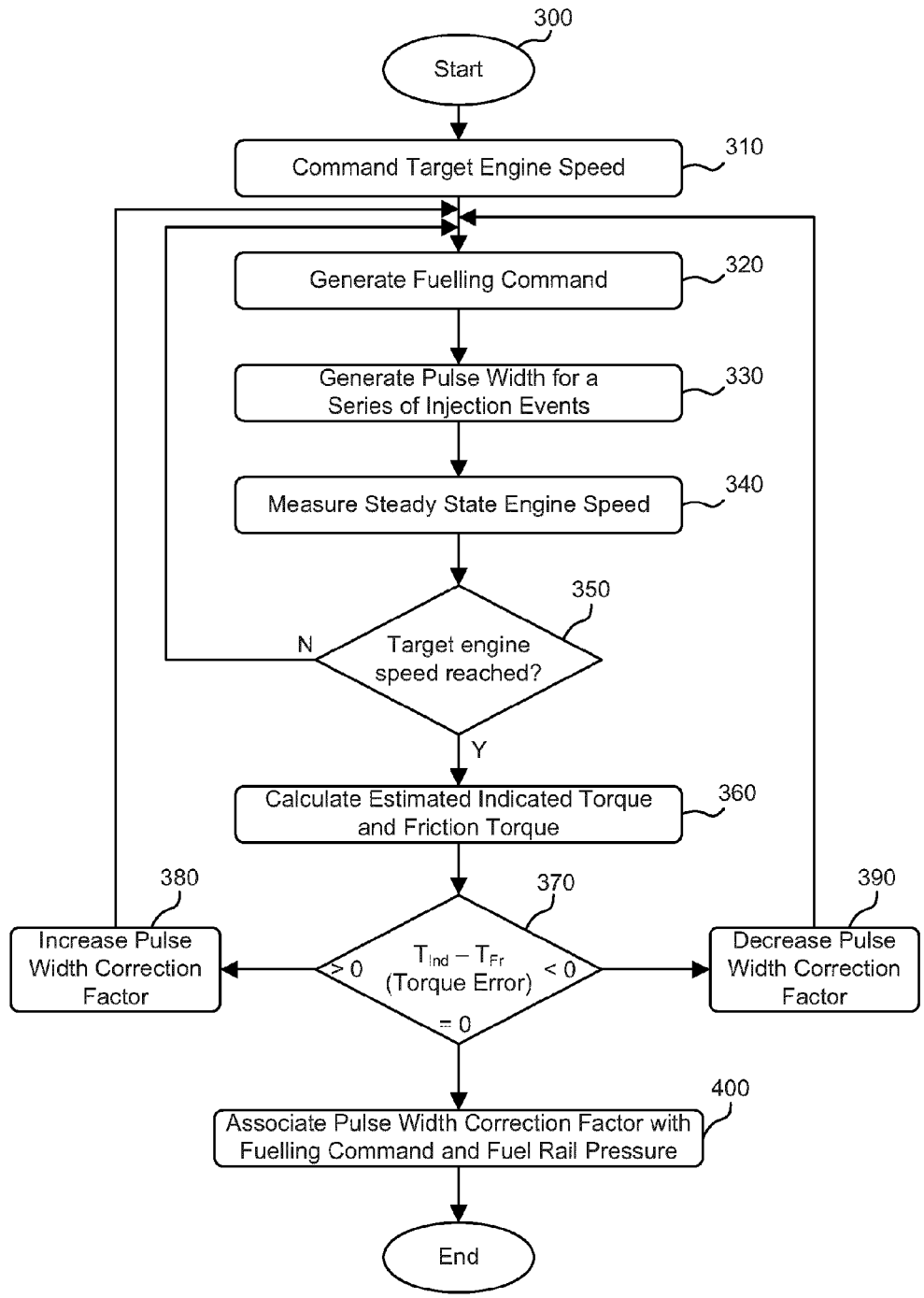
FIG. 10 is a flowchart of the method for in situ fuel injector calibration according to the embodiment of FIG. 7.

With reference to FIGS. 7 and 10, the method for in situ calibration of fuel injectors 200 in engine 50 will now be described for a first calibration condition comprising a first target fuelling and a first fuel rail pressure. Target fuelling is defined as a target quantity of fuel delivered to the combustion chamber per stroke of engine 50. In this example, the first target fuelling is achieved by idling engine 50 at a first target engine speed during zero brake torque operation. In order to idle the engine at the first target engine speed a specific amount of fuel must be delivered to the combustion chamber in order to generate torque through combustion that overcomes the friction torque at the first target engine speed. One goal of the calibration sequence is to make a commanded quantity of fuel that is to be delivered to the combustion chamber substantially equal to an actual quantity of fuel delivered to the combustion chamber. In step 300 an operator initiates the calibration procedure. The calibration procedure is performed when vehicle speed is zero and automated manual transmission 20 is disconnected from engine 50 such that engine 50 is operating at zero brake torque. In addition, engine coolant temperature is monitored to maintain engine 50 within normal operating temperatures. The procedure is aborted if vehicle speed becomes greater than zero or when engine coolant temperature is out of the normal operating range, or when a gear is selected other than park or neutral.

In step 310, governor 80 is commanded to drive engine 50 to target engine speed $E_{tspd}$, and in step 320, governor 80 generates fuel command 130 accordingly. Pulse-width 190 for a first series of injection events is generated in step 330 based on fuel command 130 and fuel rail pressure 135. Actual engine speed $E_{spd}$ is measured in step 340 after it has reached a steady state value due to the first series of injection events. Governor 80 compares actual engine speed $E_{sp}$d with target engine speed $E_{tsp}$d in step 350, and if they are not equal steps 320, 330 and 340 are repeated until actual engine speed $E_{spd}$ is equal to target engine speed $E_{tspd}$ within a predetermined tolerance range.

In step 360 engine control unit 40 calculates friction torque $TF_l$ from inputs comprising actual engine speed $E_{spd}$, and calculates estimated indicated torque TM from inputs comprising fuelling command 130 when engine 50 is operating at target engine speed $E_{tspd}$. In step 370 torque error 230 is calculated as the difference between estimated indicated torque $T_{Ind}$ and friction torque $T_{Fr}$.

Figure 13:
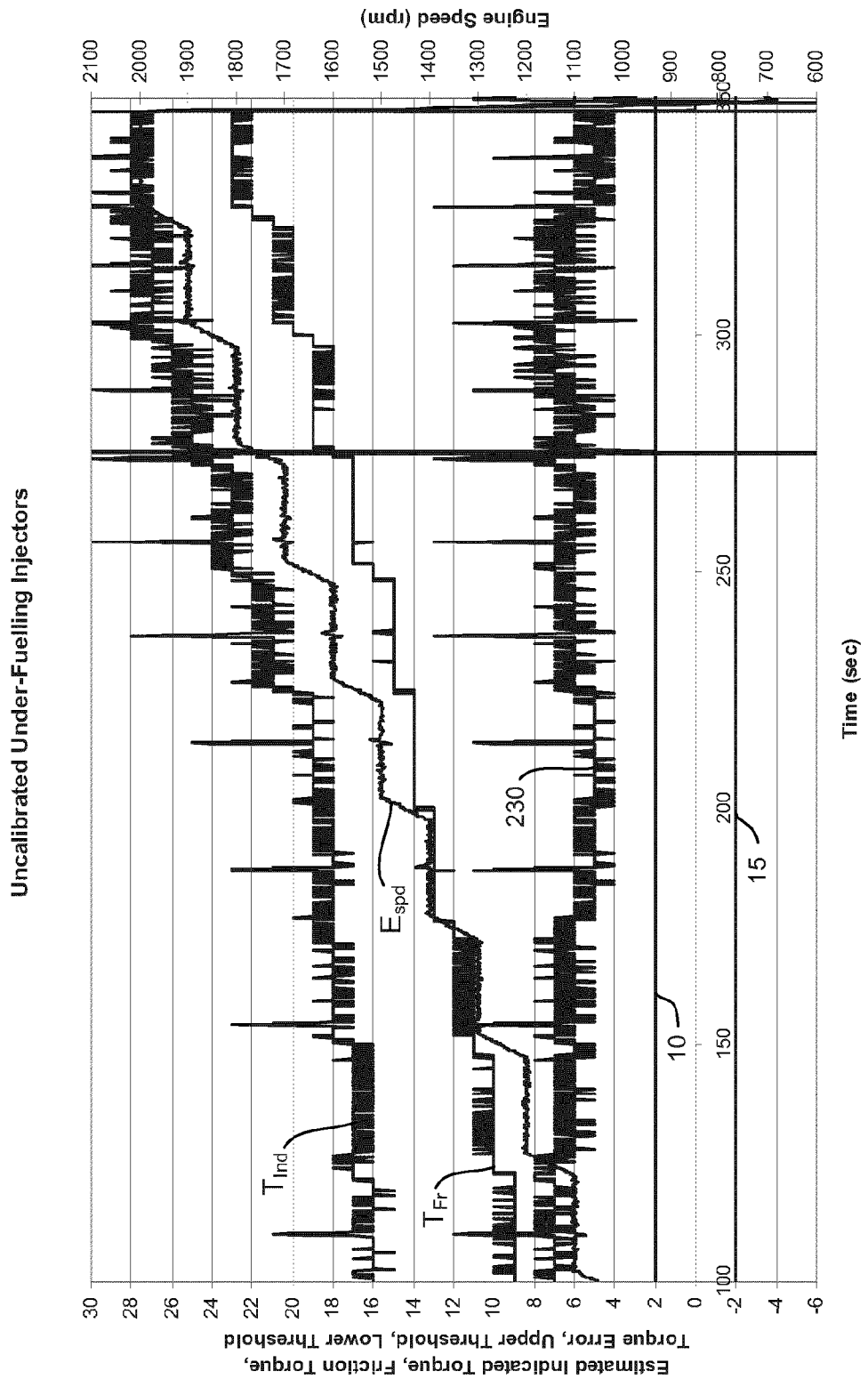
FIG. 13 is a plot of estimated indicated torque, friction torque, torque error and actual engine speed for an engine comprising under-fuelling injectors.

Torque error 230 is greater than zero when estimated indicated torque $T_{Ind}$ is greater than friction torque $T_{Fr}$. In this situation the injectors are in actuality under-fuelling and therefore estimated indicated torque $T_{Ind}$ is artificially high. FIG. 13 illustrates, for an engine with under-fuelling injectors, estimated indicated torque $T_{Ind}$, friction torque $T_{Fr}$ and torque error 230 at a number of different engine speeds $E_{spd}$. Under-fuelling means the actual quantity of fuel delivered during the injection event is less than the commanded quantity of fuel, and in order to attain target engine speed $E_{tspd}$ the commanded quantity of fuel must be increased. Step 380 is performed when torque error 230 is greater than zero whereby pulse-width correction factor 180 is increased such that pulse-width 190 increases. The increase in pulse-width causes actual engine speed $E_{spd}$ to increase. Governor 80 responds to actual engine speed $E_{spd}$ increase by decreasing fuel command 130 to bring actual engine speed $E_{sp}$d back to target engine speed $E_{spd}$, as described above, thereby decreasing pulse-width 190. Note that pulse-width 190 and the respective quantity of fuel injected in the combustion chamber are substantially constant when engine 50 is operating at the first target engine speed and the first fuel rail pressure even though fuel command 130 has changed. This reduction in fuel command 130 also reduces estimated indicated torque $T_{Ind}$ and brings it closer to friction torque $T_{Fr}$. This process repeats until torque error 230 is reduced to within a predetermined range that is within an acceptable level of tolerance for automated manual transmission 20.

Figure 14:
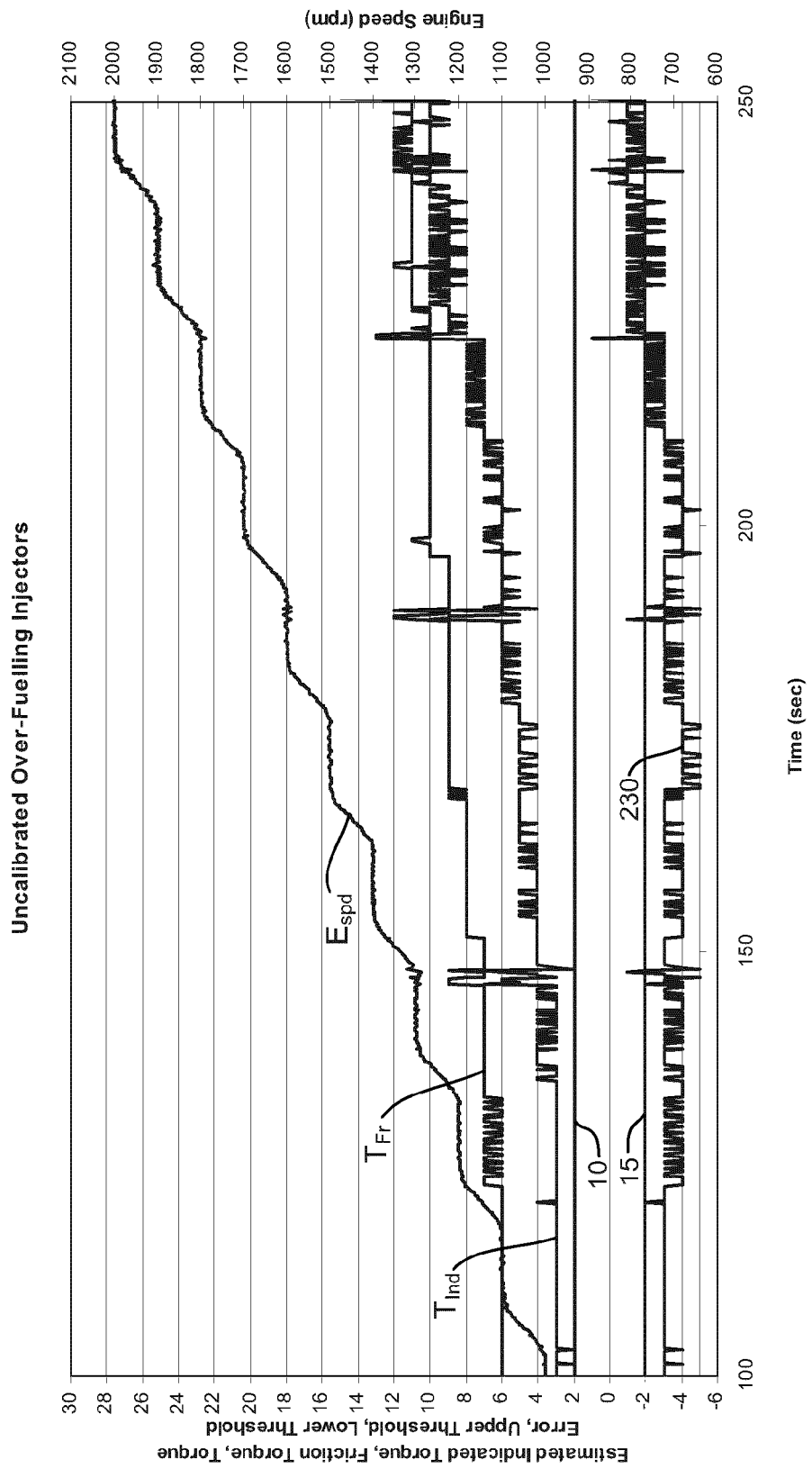
FIG. 14 is a plot of estimated indicated torque, friction torque, torque error and actual engine speed for an engine comprising over-fuelling injectors.

Torque error 230 is less than zero when estimated indicated torque $T_{Ind}$ is less than friction torque $T_{Fr}$. In this situation the injectors are in actuality over-fuelling and therefore estimated indicated torque $T_{Ind}$ is artificially low. FIG. 14 illustrates, for an engine with over-fuelling injectors, estimated indicated torque $T_{Ind}$, friction torque $T_{Fr}$, and torque error 230 at a number of different engine speeds $E_{spd}$. Over-fuelling means the actual quantity of fuel delivered during the injection event is greater than the commanded quantity of fuel, and in order to attain target engine speed $E_{tspd}$ the commanded quantity of fuel must be decreased. Step 390 is performed when torque error 230 is less than zero whereby pulse-width correction factor 180 is decreased such that pulse-width 190 decreases. The decrease in pulse-width causes actual engine speed $E_{spd}$ to decrease. Governor 80 responds to actual engine speed $E_{spd}$ decrease by increasing fuel command 130 to bring actual engine speed $E_{sp}$d back to target engine speed $E_{tspd}$, as described above, thereby increasing pulse-width 190. This increase in fuel command 130 also increases estimated indicated torque $T_{Ind}$ and brings it closer to friction torque $T_{Fr}$. This process repeats until torque error 230 is reduced to within a predetermined range that is within an acceptable level of tolerance for automated manual transmission 20.

Closed loop control 120 provides convergence of torque error 230 to within the predetermined range is generally achieved. Limits are placed on the magnitude of the allowed pulse-width correction factor and the time taken at a given calibration condition, that is target fuelling and fuel rail pressure. For example, the procedure will abort if the correction factor is outside of reasonable bounds and will timeout at some point and not search indefinitely for an acceptable correction factor. In step 400 pulse-width correction factor 180, as finally modified in steps 380 and/or 390, is associated with fuel command 130 last issued by the governor 80 and the first fuel rail pressure associated with the first calibration condition.

Figure 11:
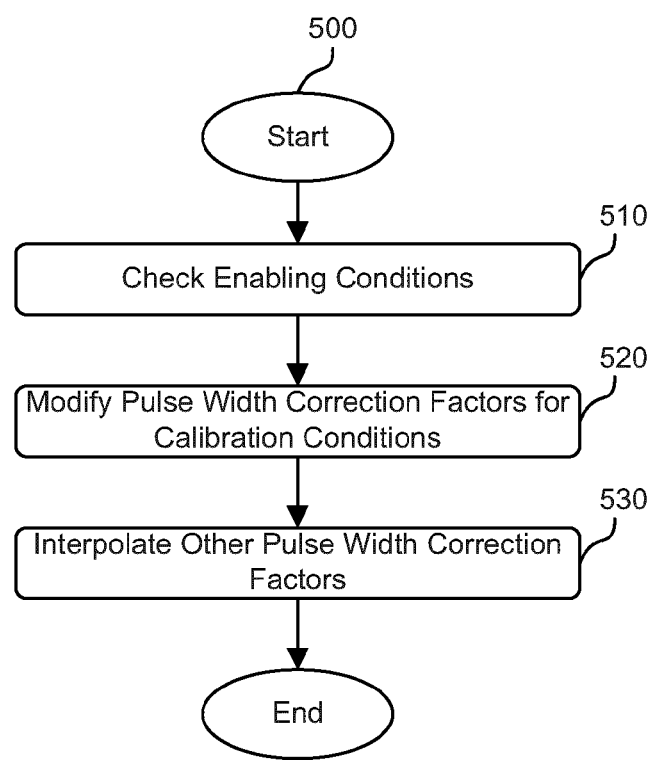
FIG. 11 is a flowchart of a complete calibration sequence for the method of in situ fuel injector calibration according to the embodiment of FIG. 7.
Figure 12:
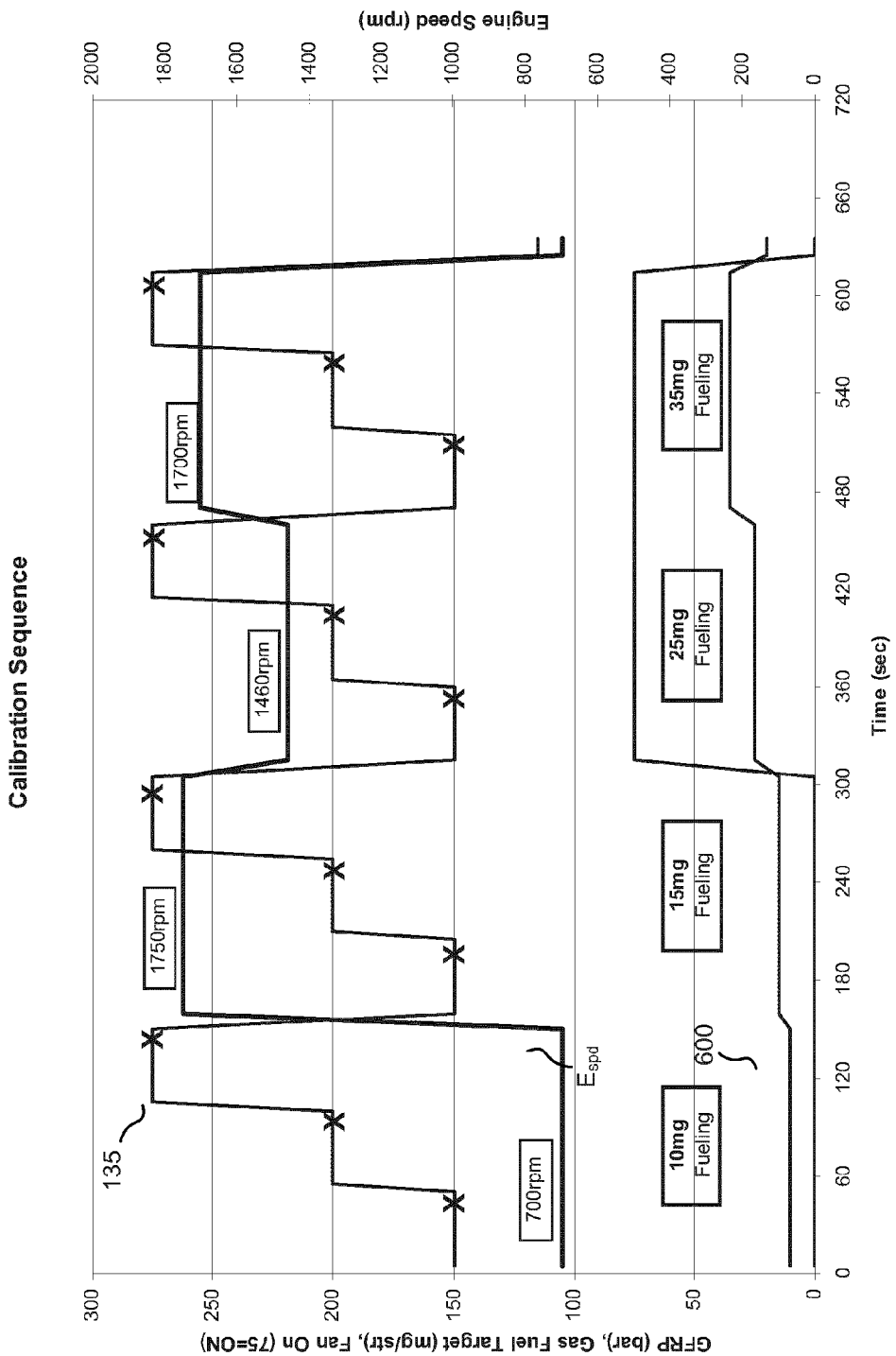
FIG. 12 is a plot of fuel rail pressure, target engine speed and target fuelling for the complete calibration sequence according to the flowchart of FIG. 11.

Referring now to FIGS. 11 and 12 a complete calibration sequence comprising multiple calibration conditions is explained in more detail. Each calibration condition comprises a unique combination of target fuelling 600 and fuel rail pressure 135. An operator initiates the complete calibration sequence in step 500, for example before or after a break-in period of the fuel injectors in engine 50, or at predetermined time intervals for vehicle servicing. Additionally, engine control unit 40 can monitor torque error 230 while engine 50 is idling sufficiently long to calculate estimated indicated torque $T_{Ind}$ and friction torque $T_{Fr}$ accordingly and can determine whether torque error 230 is outside the predetermined range defined by upper threshold 10 and lower threshold 15, in which case an operator can be notified that the calibration sequence should be performed. Engine control unit 40 monitors enabling conditions for calibration in step 510, such as engine temperature, vehicle speed, and gear selection. This is illustrated in FIG. 12 as the region prior to zero (0) seconds on the x-axis. Engine 50 is allowed to idle such that engine temperatures reach normal operating conditions. The engine temperature must be within a normal operating temperature range, the vehicle speed must be zero and the selected gear of the vehicle must be park or neutral. The calibration sequence will not proceed until all enabling conditions are met, and will terminate if any of the enabling conditions is not continued to be met.

In step 520 the pulse width correction factors for the multiple calibration conditions are corrected. Each of the points in time at which calibration is achieved for respective calibration conditions is marked with an 'X' on the plot of fuel rail pressure 135 for illustrative purposes. For each of the calibration conditions, that is unique combinations of target fuelling and fuel rail pressure, the method of FIG. 10 is performed in order to determine respective pulse-width correction factors 180. There are four target fuellings illustrated in FIG. 12: 10 mg/stroke, 15 mg/stroke, 25 mg/stroke and 35 mg/stroke. The 10 mg/stroke and 15 mg/stroke fuellings are attained by idling engine 50 at target engine speeds of 700 rpm and 1750 rpm respectively, in this example. The 25 mg/stroke and 35 mg/stroke fuellings are attained by idling engine 50 at 1460 rpms and 1700 rpms respectively while the engine fan is simultaneously on. The engine fan adds an extra load on engine 50 while operating at zero brake torque. As seen in FIG. 7, each pulse-width correction factor 180 is associated with a respective fuel command 130 and fuel rail pressure 135. Pulse-width 190 is created by indexing into baseline pulse-width map 140 and pulse-width correction factor map 150 using fuel command 130 and fuel rail pressure 135, and multiplying baseline pulse-width 170 by pulse-width correction factor 180. The last calibration point is achieved around the 600 second mark on the time scale.

A result of step 520 is the setting of pulse-width correction factors 180 for respective fuel commands 130 and fuel rail pressures 135 such that the target fuellings 600, as seen in FIG. 12, are actually injected into the combustion chambers. In step 530 pulse-width correction factors 180 not adjusted during the calibration sequence due to the finite number of calibration conditions are set by interpolation between calibrated values. Pulse-width correction factors 180 outside of the low fuelling portion of FIG. 1, that is when pulse width 190 is above critical on-time $T_C$, can be fixed at one (1) to ramp out uncalibrated pulse width correction factors 180 to the commanded quantity of fuelling that is known to be accurate to within the predetermined range that is within the acceptable level of tolerance.

The method of in situ fuel injector calibration can be carried out on a single fuel injector, for example in an engine that has a single combustion chamber or on an engine that has a plurality of combustion chambers and fuel injectors. In the latter case, the fuel injectors not being calibrated must be disabled from injecting fuel into their respective combustion chambers during the calibration of the single fuel injector. Preferably, for an engine that has a plurality of combustion chambers and fuel injectors, the method can be performed while all fuel injectors are enabled and injecting fuel into respective combustion chambers during respective injection periods of each combustion chamber. An advantage of calibrating a single fuel injector independently of other fuel injectors is that its respective low fuelling characteristic can be adjusted according to its individual requirements, thereby precisely calibrating injection of fuel from the single fuel injector. An advantage of carrying out calibration on all injectors simultaneously is a faster calibration sequence and calibration for a normal mode of operation for the vehicle where all fuel injectors are normally used. Automated manual transmission 20 requires an accurate torque from engine 50, but it does not care from which fuel injectors the torque comes.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of calibrating injection of fuel into at least one combustion chamber of an internal combustion engine operating at zero brake torque, the internal combustion engine comprising at least one fuel injector and a fuel rail pressurized to a fuel rail pressure, the method comprising steps of:
   (a) calculating an indicated torque for the internal combustion engine operating at a target fuelling from inputs comprising a fuelling command, the target fuelling being attained by operating the engine at a target engine speed;
   (b) calculating a friction torque for the internal combustion engine from inputs comprising the target engine speed;
   (c) calculating a torque error from a difference between the indicated torque and the friction torque; and
   (d) determining a pulse-width correction factor for a first baseline pulse-width applied to actuate the at least one fuel injector whereby the torque error is within a predetermined range when the internal combustion engine is operating at the target fuelling.

2. The method of claim 1, wherein the fuel is a gaseous fuel.

3. The method of claim 1, wherein the step of determining the pulse-width correction factor comprises a sub-step of modifying the pulse-width correction factor in a feedback control loop.

4. The method of claim 1, wherein the method is performed prior to a break-in period of the fuel injector in the internal combustion engine.

5. The method of claim 1, wherein the method is performed after a break-in period of the fuel injector in the internal combustion engine.

6. The method of claim 1, wherein the method is performed at predetermined time intervals when the internal combustion engine is serviced.

7. The method of claim 1, wherein the method is performed after determining the torque error is outside the predetermined range while the internal combustion engine is idling.

8. The method of claim 1, wherein the calibration is terminated when a temperature of the internal combustion engine is outside a normal engine operating temperature range.

9. The method of claim 1, wherein the calibration is terminated when a vehicle comprising the internal combustion engine has a vehicle speed greater than zero.

10. The method of claim 1, wherein the calibration is terminated when a selected gear of a vehicle comprising the internal combustion engine is not park or neutral.

11. The method of claim 1, wherein the method is performed on one fuel injector of the internal combustion engine.

12. The method of claim 1, wherein the method is performed on all fuel injectors of the internal combustion engine.

13. The method of claim 1, wherein the target fuelling is further manipulated by operating an engine fan.

14. The method of claim 1, wherein the method further comprises a step of successively repeating steps (a) through (d) for a plurality of target fuellings for the internal combustion engine.

15. The method of claim 1, wherein the method further comprises a step of successively repeating steps (a) through (d) for a plurality of fuel pressures in the fuel rail.

16. The method of claim 1, wherein the method further comprises a step of successively repeating steps (a) through (d) for a plurality of target fuelling and fuel rail pressure combinations, each respective target fuelling and fuel rail pressure combination defining a calibration condition.

17. The method of claim 16, wherein respective pulse-width correction factors for respective calibration conditions are associated with respective fuelling command and fuel rail pressure combinations.

18. The method of claim 17, wherein respective pulse-width correction factors for respective uncalibrated fuelling command and fuel rail pressure combinations are determined by interpolating between respective pulse-width correction factors for respective calibrated fuelling command and fuel rail pressure combinations.

19. The method of claim 17, wherein respective pulse-width correction factors for respective uncalibrated fuelling command and fuel rail pressure combinations are determined by interpolating between respective pulse-width correction factors for respective calibrated fuelling command and fuel rail pressure combinations and fixed pulse-width correction factors.

20. The method of claim 1, wherein the method comprises sub-steps prior to the steps of calculating of:
   (i) commanding the target engine speed for the internal combustion engine;
   (ii) generating the fuelling command to drive said internal combustion engine to the target engine speed;
   (iii) generating the first baseline pulse-width based on the fuelling command and the fuel rail pressure; and
   (iv) generating a first pulse-width as a function of the first baseline pulse-width and the pulse-width correction factor for a first series of injection events for the at least one fuel injector.

21. The method of claim 20, wherein the step of determining the pulse-width correction factor comprises sub-steps of:
   determining the at least one fuel injector is under-fuelling; and
   modifying the pulse-width correction factor to increase said first pulse-width.

22. The method of claim 20, wherein the step of determining the pulse-width correction factor comprises sub-steps of:
   determining the at least one fuel injector is over-fuelling; and modifying the pulse-width correction factor to decrease said first pulse-width.

23. The method of claim 20, wherein the step of determining the pulse-width correction factor comprises substeps of:
  determining the torque error is not within the predetermined range;
  adjusting the pulse-width correction factor based on the torque error;
  generating a second fuelling command to drive said internal combustion engine to the first target engine speed; and
  generating a second pulse-width based on the second fuelling command and the fuel rail pressure for a second series of injection events for the at least one fuel injector, the second pulse-width being generated as a function of a second baseline pulse-width corrected by the pulse-width correction factor;
  whereby the first pulse-width is substantially equal to the second pulse-width.

24. The method of claim 23, wherein the torque error is within the predetermined range and the pulse-width correction factor is associated with the second fuel command and the fuel rail pressure.

25. The method of claim 23, wherein a first quantity of fuel is injected into the at least one combustion chamber when the at least one fuel injector is actuated by the first pulse-width and a second quantity of fuel is injected into the at least one combustion chamber when the at least one fuel injector is actuated by the second pulse-width, the first quantity of fuel being substantially equal to the second quantity of fuel.

26. An apparatus for calibrating injection of fuel into at least one combustion chamber of an internal combustion engine operating at zero brake torque, the internal combustion engine comprising at least one fuel injector and a fuel rail pressurized to a fuel rail pressure, the apparatus comprising an engine speed sensor and a computer programmed to:
  (a) calculate an indicated torque for the internal combustion engine operating at a target fuelling from inputs comprising a fuelling command, the target fuelling being attained by operating the engine at a target engine speed;
  (b) calculate a friction torque for the internal combustion engine from inputs comprising the target engine speed;
  (c) calculate a torque error from a difference between the indicated torque and the friction torque; and
  (d) determine a pulse-width correction factor for a first baseline pulse-width applied to actuate the at least one fuel injector whereby the torque error is within a predetermined range when the internal combustion engine is operating at the target fuelling.

27. The apparatus of claim 26, wherein the fuel is a gaseous fuel.

28. The apparatus of claim 26, wherein the computer is further programmed to modify the pulse-width correction factor in a feedback control loop.

29. The apparatus of claim 26, wherein the apparatus further comprises an operator controlled input to initiate calibration.

30. The apparatus of claim 26, wherein the computer is further programmed to terminate calibration when a temperature of the internal combustion engine is outside a normal engine operating temperature range.

31. The apparatus of claim 26, wherein the computer is further programmed to terminate calibration when a vehicle comprising the internal combustion engine has a vehicle speed greater than zero.

32. The apparatus of claim 26, wherein the computer is further programmed to terminate calibration when a selected gear of a vehicle comprising the internal combustion engine is not park or neutral.

33. The apparatus of claim 26, wherein the computer is further programmed to perform calibration on one fuel injector of the internal combustion engine.

34. The apparatus of claim 26, wherein the computer is further programmed to perform calibration on all fuel injectors of the internal combustion engine.

35. The apparatus of claim 26, wherein the target fuelling is further manipulated by operating an engine fan.

36. The apparatus of claim 26, wherein the computer is further programmed to successively repeat steps (a) through (d) for a plurality of target fuellings for the internal combustion engine.

37. The apparatus of claim 26, wherein the computer is further programmed to successively repeat steps (a) through (d) for a plurality of fuel pressures in the fuel rail.

38. The apparatus of claim 26, wherein the computer is further programmed to successively repeat steps (a) through (d) for a plurality of target fuelling and fuel rail pressure combinations, each respective target fuelling and fuel rail pressure combination defining a calibration condition.

39. The apparatus of claim 38, wherein the computer is further programmed to associate respective pulse-width correction factors for respective calibration conditions with respective fuelling command and fuel rail pressure combinations.

40. The apparatus of claim 38, wherein the computer is further programmed to determine respective pulse-width correction factors for respective uncalibrated fuelling command and fuel rail pressure combinations by interpolating between respective pulse-width correction factors for respective calibrated fuelling command and fuel rail pressure combinations.

41. The apparatus of claim 38, wherein the computer is further programmed to determine respective pulse-width correction factors for respective uncalibrated fuelling command and fuel rail pressure combinations by interpolating between respective pulse-width correction factors for respective calibrated fuelling command and fuel rail pressure combinations and fixed pulse-width correction factors.

42. The apparatus of claim 26, wherein the computer is further programmed to:
  (e) command the target engine speed for the internal combustion engine;
  (f) generate the fuelling command to drive said internal combustion engine to the target engine speed;
  (g) generate the first baseline pulse-width based on the fuelling command and the fuel rail pressure; and
  (h) generate a first pulse-width as a function of the first baseline pulse-width and the pulse-width correction factor for a first series of injection events for the at least one fuel injector.

43. The apparatus of claim 42, wherein the computer is further programmed to:
  (i) determine the at least one fuel injector is under-fuelling; and
  (j) modify the pulse-width correction factor to increase said first pulse-width.

44. The apparatus of claim 42, wherein the computer is further programmed to:

(i) determine the at least one fuel injector is over-fuelling; and
(j) modify the pulse-width correction factor to decrease said first baseline pulse-width.

45. The apparatus of claim 42, wherein the computer is further programmed to:
(i) determine the torque error is not within the predetermined range;
(j) adjust the pulse-width correction factor based on the torque error;
(k) generate a second fuelling command to drive said internal combustion engine to the target engine speed; and
(l) generate a second pulse-width based on the second fuelling command and the fuel rail pressure for a second series of injection events for the at least one fuel injector, the second pulse-width being generated as a function of a second baseline pulse-width and the pulse-width correction factor;
whereby the first pulse-width is substantially equal to the second pulse-width.

* * * * *